E. E. DURYEA.
METHOD OF DRYING STARCH.
No. 172,099. Patented Jan. 11, 1876.
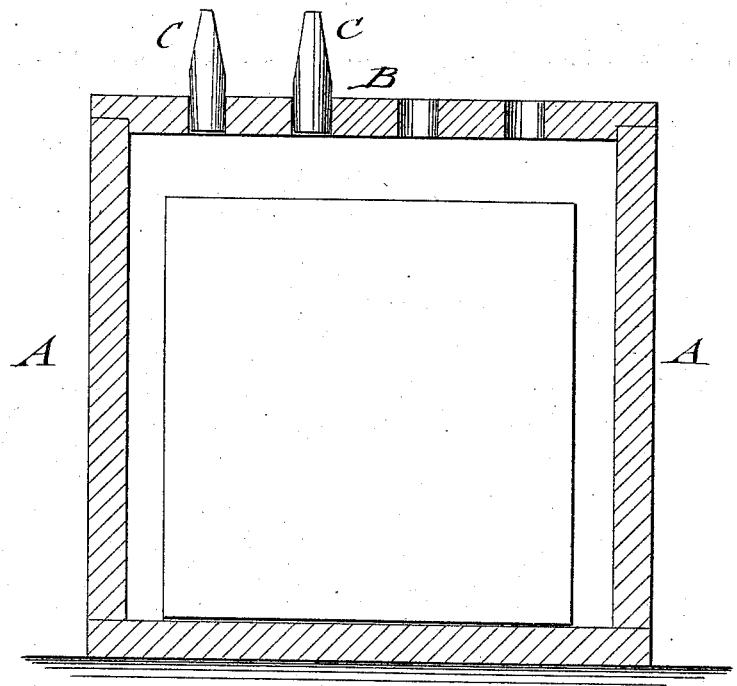
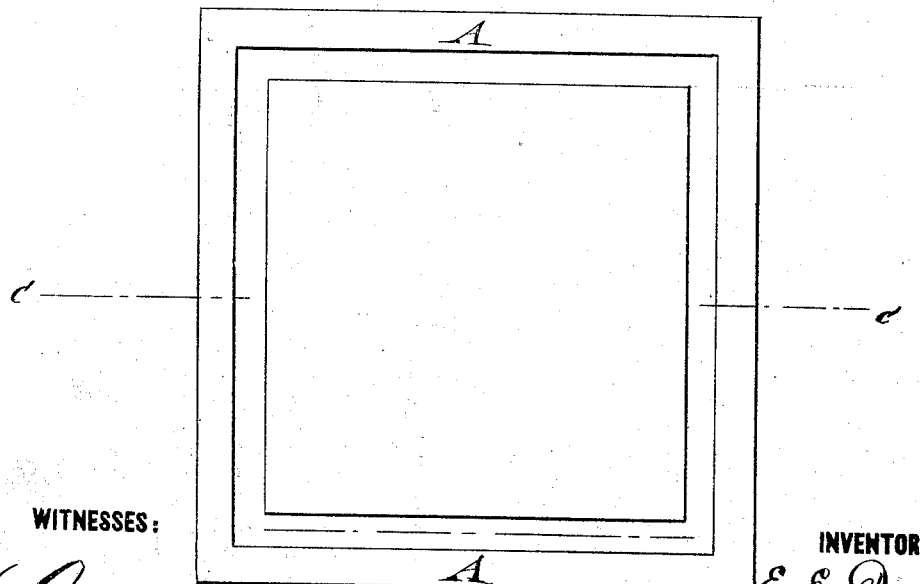
WITNESSES:
Chas. Nida
Alex F. Roberts
INVENTOR:
E. E. Duryea
BY
ATTORNEYS.

UNITED STATES PATENT OFFICE.

EDGAR E. DURYEA, OF GLEN COVE, NEW YORK.

IMPROVEMENT IN METHODS OF DRYING STARCH.

Specification forming part of Letters Patent No. 172,099, dated January 11, 1876; application filed December 27, 1875.

*To all whom it may concern:*

Be it known that I, EDGAR E. DURYEA, of Glen Cove, in the county of Queens and State of New York, have invented a new and Improved Method of Drying Starch, of which the following is a specification:

This invention has reference to the manufacture of starch, and more especially to the drying of the same, so that this operation may be more perfectly and economically accomplished, and the injuries avoided which are frequently the result of the methods at present employed.

Hitherto the molded pieces of starch have been exposed upon racks in kilns or drying-rooms to the action of the heat, or spread upon shelves of iron or other material.

In all the present methods the wet starch is exposed to the direct and immediate action of the surrounding atmosphere, and thereby subject to the sudden changes of the currents and temperature of the same, which affects the starch injuriously, and prevents uniform results by the interruption of evaporation, the formation of dextrine, &c., so that the starch becomes of less value for the trade and the purposes for which it is designed.

The present invention consists, mainly, in exposing the cube-shaped pieces of starch in vessels or forms of porous material to the action of the heat, so as to protect it against sudden changes of temperature, assist in the regular absorption of the vapors, and admit full control of the progress of the drying process.

The accompanying drawing illustrates one shape of the form or vessel employed in my method of drying starch, in which—

Figure 1 is a vertical central section of a drying-vessel on line *c c*, Fig. 2; and Fig. 2, a top view of the same with perforated cover detached.

Similar letters of reference indicate corresponding parts.

A represents a form or vessel that corresponds to the shape of the blocks or pieces of starch to be dried. The vessels are, preferably, made somewhat larger than the blocks of starch, so that the same may be readily introduced therein. The forms A are made of any porous material, such as wood, clay, or their equivalent, or of metal with a lining or partial lining of porous material, and made to contain one or more blocks of starch.

The forms may be arranged stationary in the kiln or drying-room, or portable, as found most convenient. They may be used with or without a cover, B, which is provided with a number of perforations that may be closed by suitable plugs C. The cover and plugs give a perfect control over the starch in the forms, and regulate the admission of the heated air at the various stages of the drying process, and the entire shutting out of air, as required for the perfect drying or crystallizing of the starch.

The inclosing-forms are mainly employed for preventing the drying starch from being injuriously affected by sudden changes of temperature in the drying-room, as caused by currents of air by opening the doors or other causes.

The drying of the starch is the more satisfactory the more uniform the temperature at which the drying process is accomplished, as thereby the formation of the starch prisms, or the "crystallizing," is produced in a more perfect manner.

The forms furnish a uniform degree of heat to the starch in the same, and protect it against sudden currents of air, while they assist, further, the drying effectively by the absorption of the evaporated moisture. This forms the second point of advantage in the use of the forms, as thereby the injurious effects of the reabsorption of moisture by variations in the temperature, and the interruption of the formation of the starch prisms, are obviated.

The inclosing-forms keep the starch continually surrounded by dry and warm air of uniform temperature, which accelerates the drying process, while the absorption of the evaporated moisture aids and facilitates materially the progress of the drying operations, providing thus a method for drying starch adapted to the extreme sensitiveness of the starch to change of temperature, and furnishing a product of superior quality and purity.

I do not claim exposing starch to drying action of heat upon and by means of a heated porous tile or plate; but,

Having thus described my invention, I claim as new and desire to secure by Letters Patent—

1. The process of drying starch herein described, consisting in exposing the same in vessels of porous material to the action of heat within a kiln or drying-chamber, thus preventing sudden changes of temperature, substantially as set forth.

2. The starch-containing vessel A, for use within a drying-kiln, the same being formed of porous material, and provided with a perforated top having closing-plugs, as shown and described.

EDGAR E. DURYEA.

Witnesses:
T. B. MOSHER,
PAUL GOEPEL.